(12) United States Patent
Tan et al.

(10) Patent No.: US 12,482,021 B2
(45) Date of Patent: Nov. 25, 2025

(54) PERSONALIZED MACHINE-LEARNED LARGE LANGUAGE MODEL (LLM)

(71) Applicant: Maplebear Inc., San Francisco, CA (US)

(72) Inventors: Li Tan, Fremont, CA (US); Haixun Wang, Bellevue, WA (US); Jian Li, Santa Clara, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/498,967

(22) Filed: Oct. 31, 2023

(65) Prior Publication Data

US 2025/0005629 A1 Jan. 2, 2025

Related U.S. Application Data

(60) Provisional application No. 63/523,610, filed on Jun. 27, 2023.

(51) Int. Cl.
*G06Q 30/0251* (2023.01)
*G06N 20/00* (2019.01)
*G06Q 50/12* (2012.01)

(52) U.S. Cl.
CPC ........ *G06Q 30/0271* (2013.01); *G06N 20/00* (2019.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 10,417,350 | B1 * | 9/2019 | Mohamed | G06N 20/00 |
| 11,551,681 | B1 * | 1/2023 | Pandey | G06N 5/022 |
| 12,014,748 | B1 * | 6/2024 | Giri | G10L 21/034 |
| 2017/0032244 | A1 * | 2/2017 | Kurata | G06N 3/084 |
| 2018/0129972 | A1 * | 5/2018 | Chen | G06F 40/44 |
| 2018/0218282 | A1 * | 8/2018 | Mathew | G06N 20/00 |
| 2018/0329957 | A1 * | 11/2018 | Frazzingaro | G06F 3/167 |
| 2019/0325068 | A1 * | 10/2019 | Lai | G06F 16/951 |
| 2021/0099317 | A1 * | 4/2021 | Hilleli | G06F 40/295 |
| 2022/0237368 | A1 * | 7/2022 | Tran | G06N 20/00 |
| 2023/0083173 | A1 * | 3/2023 | Nufer | H04N 7/181 |
| | | | | 348/159 |
| 2023/0418880 | A1 * | 12/2023 | Roy | G06F 16/3344 |
| 2024/0185840 | A1 * | 6/2024 | Wang | G10L 15/063 |

* cited by examiner

*Primary Examiner* — Vincent M Cao
(74) *Attorney, Agent, or Firm* — Fenwick & West LLP

(57) ABSTRACT

A computer system finetunes a machine-learned language model to generate a personalized response to a user request. The system may generate a user representation for each of a plurality of users by applying a transformer model to a sequence of tokens representing a sequence of activities of the user. The system may train an evaluation model coupled to receive a user representation and a response to a user request and generate an estimated evaluation score indicating a level of personalization of the response to the user. The system may finetune a first machine-learned language model to generate a second machine-learned language model. The finetuned machine-learned language model is configured to provide personalized responses for customer services at an online concierge system.

20 Claims, 9 Drawing Sheets

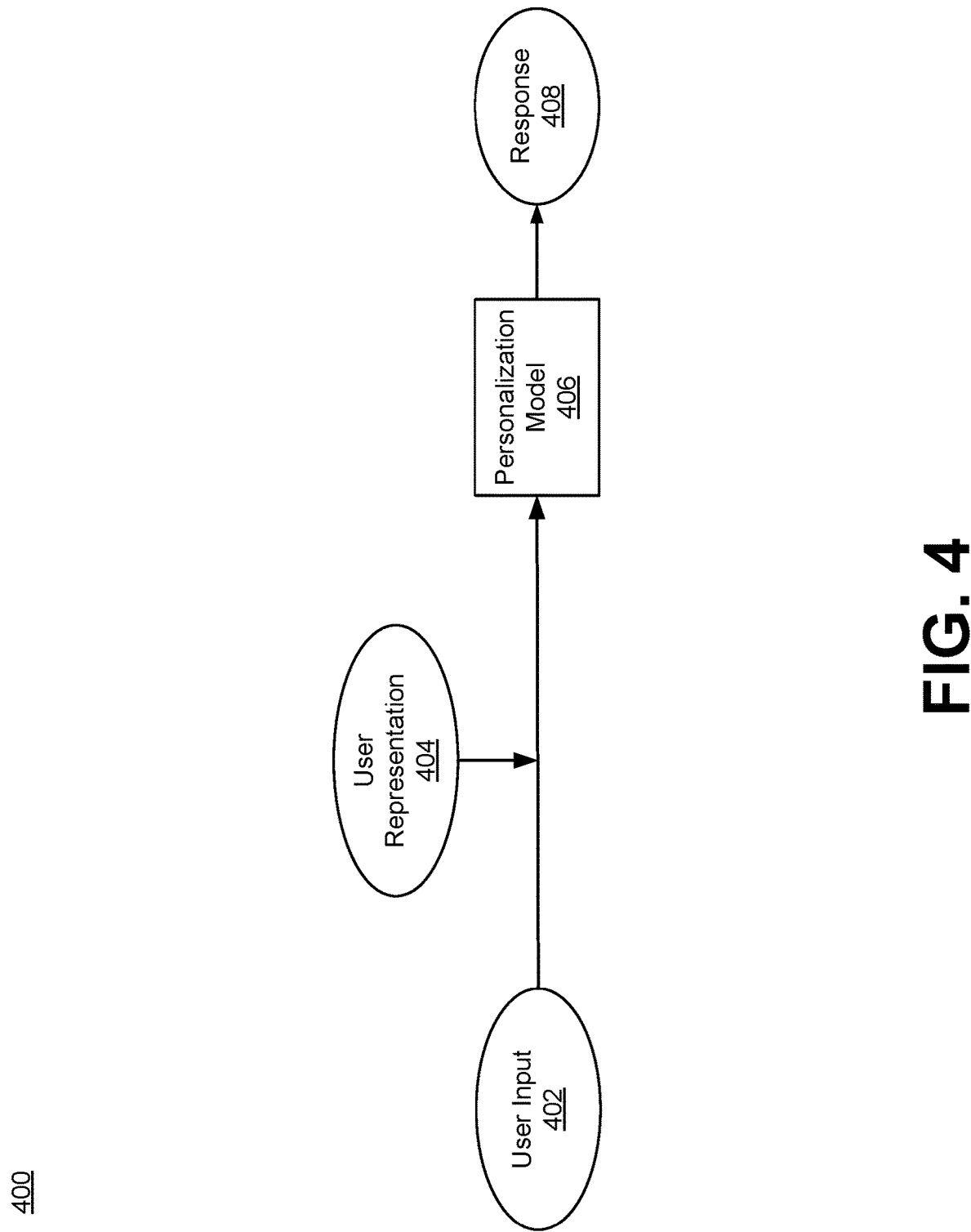

PERSONALIZED MACHINE-LEARNED LARGE LANGUAGE MODEL (LLM)

CROSS-REFERENCE

This application claims the benefit of U.S. Provisional Application No. 63/523,610, filed Jun. 27, 2023, which is incorporated by reference herein in its entirety.

BACKGROUND

Artificial intelligence (AI) and machine-learned models for data processing can be used to generate responses for a variety of tasks. While large language models (LLMs) have a vast and deep knowledge base and excel at answering general questions, they are typically trained for general purposes and lack personalization. This limitation is due to the general purposes of LLM and its training on the vast user-agnostic training dataset. The training dataset includes different data sources without incorporating the context of the profiles/context of users who requested the content. Personalization in e-commerce refers to the practice of tailoring the shopping experience of an individual customer to their specific needs and preferences. This can be accomplished in a number of ways, such as by recommending products based on a customer's past purchases, displaying personalized product recommendations on a website or in email campaigns, and offering customized pricing or promotions to specific customers. However, personalization is contingent upon a concierge system's capacity to comprehend and meet the customers' particular requests. Substantial efforts have been made to determine the intentions of users using machine learning models, but it is a technically difficult problem to tune LLM's to incorporate user context.

SUMMARY

Embodiments of the present disclosure are directed to finetuning a machine-learned language model to generate a personalized response to a user request for customer services at an online concierge system. The online concierge system may obtain a plurality of training examples for a plurality of users. Each training example may include a user request to a service for a respective user, a sequence of activities of the user, one or more responses to the user request, and a score indicating the user's satisfaction of each of the one or more responses. The online concierge system may generate a user representation for each of the plurality of users by applying a transformer model to a sequence of tokens representing the sequence of activities of the user. The online concierge system may train an evaluation model coupled to receive a user representation and a response to a user request and generate an estimated evaluation score indicating a level of personalization of the response to the user. The parameters of the evaluation model are trained based on the responses to the user requests and evaluation scores for the responses in the training examples. The online concierge system may finetune a first machine-learned language model to generate a second machine-learned language model.

In accordance with one or more aspects of the disclosure, the online concierge system may finetune the machine-learned language model by applying the user request applying the user request to the first machine-learned language model to generate a base response to the user request, applies the user request to the second machine-learned language model to generate an estimated response to the user request. The online concierge system applies the trained evaluation model to the estimated response from the second machine-learned language model to generate an estimated evaluation score. The online concierge system may compute a loss function combining a first loss indicating a divergence between the base response and the estimated response and a second loss indicating the estimated evaluation score, and backpropagates the second machine-learned language model to update parameters of the second machine-learned language model obtained on computed loss from the loss function.

In accordance with one or more aspects of the disclosure, the online concierge system may apply the finetuned machine-learned language model to generate a personalized response to a user request for customer services. The online concierge system may receive, from one or more client devices, a user input from a user. The user input may be associated with a request from the user. The online concierge system may identify a user representation associated with the user, generate a prompt for input to the finetuned machine-learned language model and provide the prompt to one or more model serving systems for execution by the finetuned machine-learned language model. The prompt specifies at least the request from the user input, the user representation, and a request to generate a personalized response to the request from the user input. The online concierge system may receive, from the one or more serving systems, one or more responses generated by executing the finetuned machine-learned language model on the prompt and determine a response to the request from the user based on the received one or more responses from the finetuned machine-learned language model.

BRIEF DESCRIPTION OF THE DRAWINGS

FIG. 4 illustrates an example algorithmic flow of using a personalization model to provide personalized responses for customer services at an online concierge system, in accordance with one or more embodiments.

DETAILED DESCRIPTION

Figure 1A:
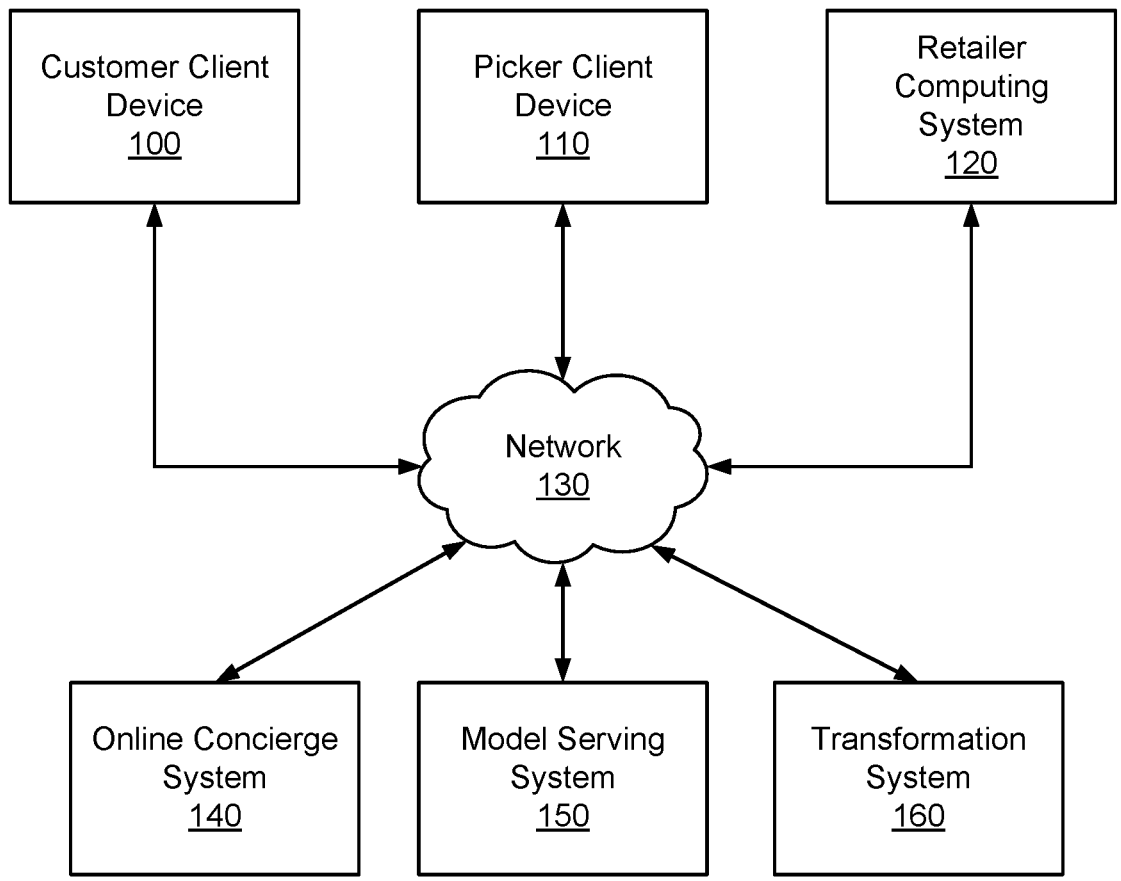
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

The online concierge system 140 prepares a prompt for input to the LLM of the model serving system 150. The prompt represents a textual input to the LLM. At least a portion of the prompt is generated by the online concierge system 140 applying a finetuned machine-learned language model. The prompt includes a user request and a user representation which indicates a user's intention and/or preference. The online concierge system 140 receives a response to the prompt from the model serving system 150 based on execution of the machine-learned model using the prompt. The response may be a personalized response for the specific user.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
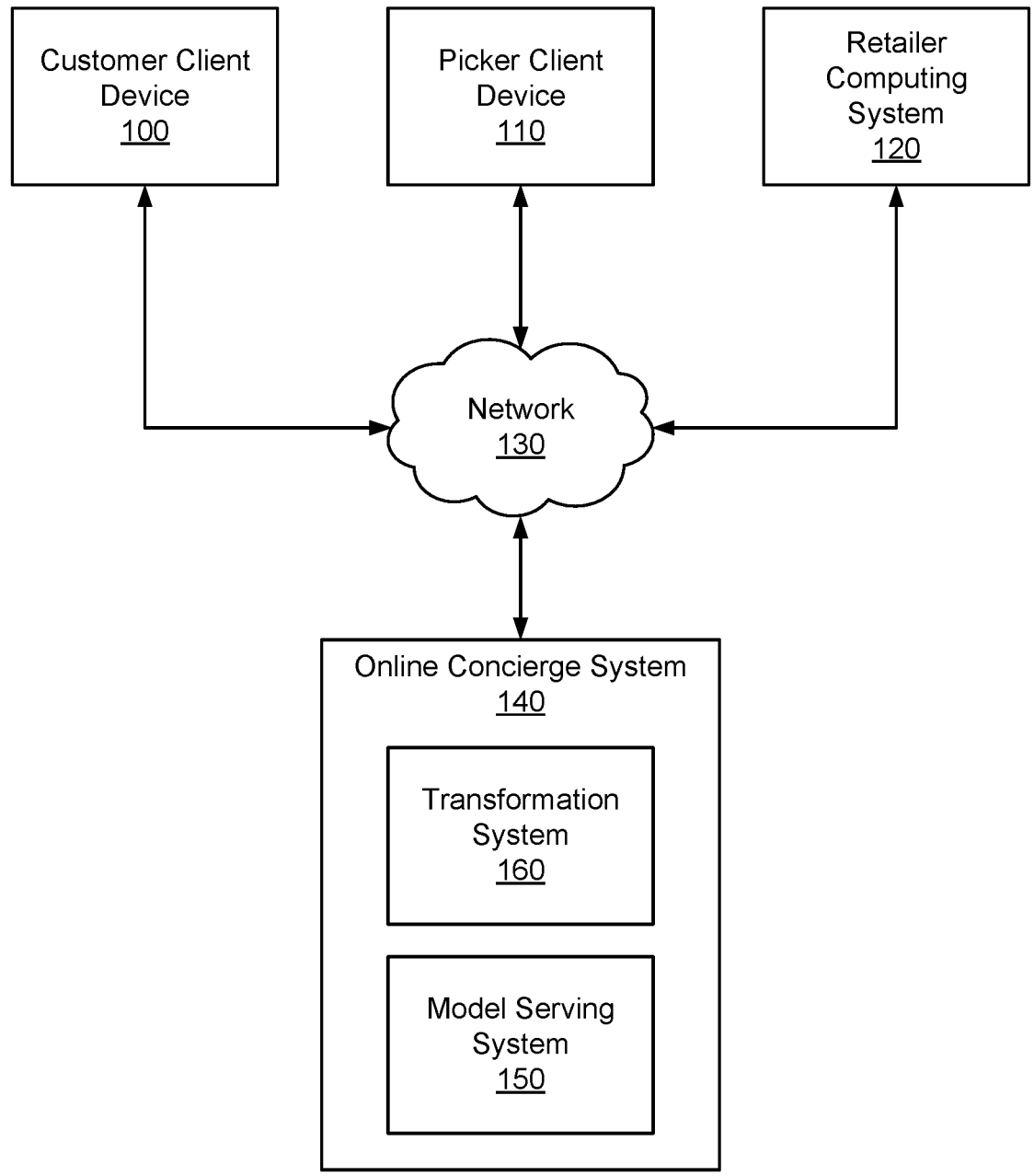
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
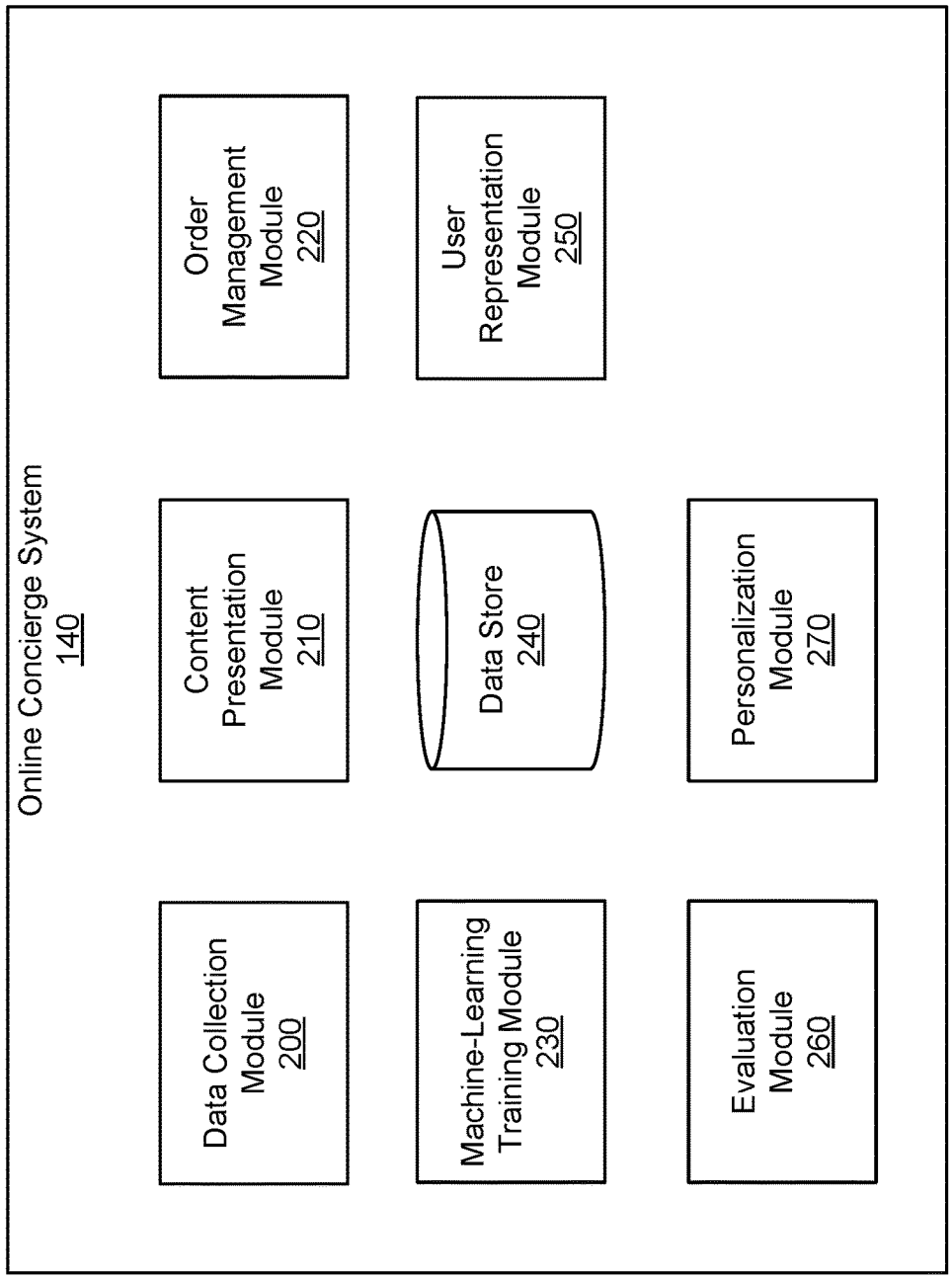
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a user representation module 250, an evaluation module 260, and a personalization module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

In one or more embodiments, the content presentation module 210 receives one or more responses to a user's input (e.g., queries) for presentation to the user while the user is engaged with the ordering interface. The responses may include recommendations of items for fulfilling the user's order request. As described in conjunction with FIGS. 1A and 1B, the responses are personalized for the user, and may be generated based on the user's intention and/or preference and include one or more suggestions to the user to better fulfill the user's request, such as, purpose of the order.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine learning module 230 may train the item selection model, the availability model, or any of the machine-learned models deployed by the model serving system 150. The online concierge system 140 may use machine-learning models to perform functionalities described herein. Example machine-learning models include reinforcement learning models, regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. In some implementations, the data store 240 may store outputs from a trained machine-learning model so that the stored outputs may be accessed and used as inputs for training one or more machine-learning models. For instance, the data store 240 may store the output of user representations, e.g., embeddings of user preference, embeddings of user intention, etc. The stored user representations may be used to generate prompts for LLM. In another example, the stored user representations may be used as input to an evaluation model. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140 or by the online concierge system 140. In one or more other embodiments, when the model serving system 150 is included in the online concierge system 140, the machine-learning training module 230 may further train parameters of the machine-learned model (e.g., LLM) based on data specific to the online concierge system 140 stored in the data store 240. As an example, the machine-learning training module 230 may obtain additional training data and further fine tune the parameters of the transformer model deployed by the model serving system 150 based on the additional training data. The machine-learning training module 230 may provide the additional training data to the model serving system 150 for fine tuning the parameters of the machine-learned model deployed on the model serving system 150.

Figure 3A:
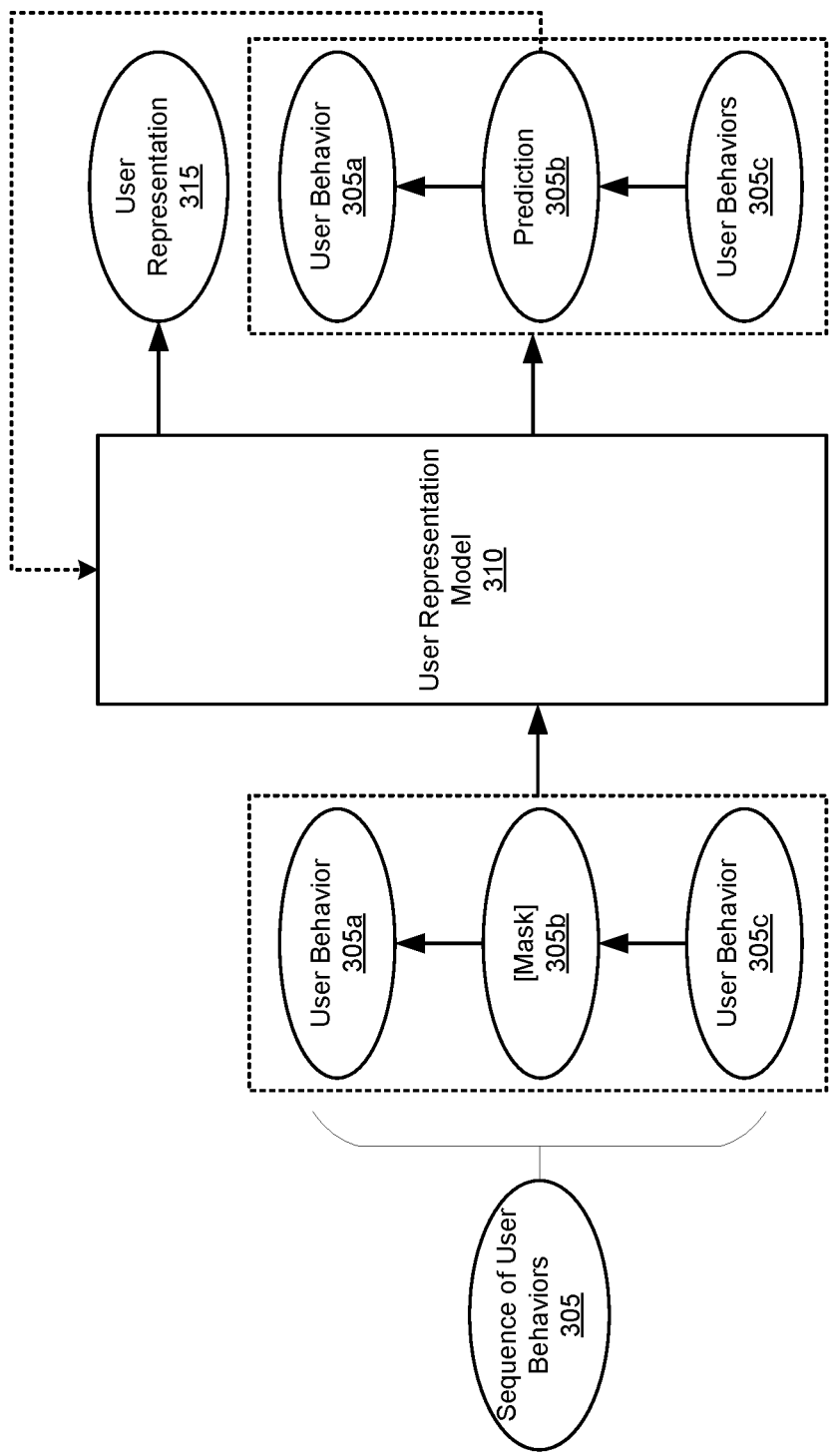
FIG. 3A illustrates an example algorithmic flow of applying a user representation model to user behaviors to output a user representation at an online concierge system, in accordance with one or more embodiments.

The user representation module 250 trains a user representation model 310 configured to receive a sequence of user behaviors to learn user intentions and/or preferences. FIG. 3A illustrates an example algorithmic flow of training a user representation model 310 to user behaviors 305 to output a user representation 315 at an online concierge system 140, in accordance with one or more embodiments. During inference (after the user representation model 310 has been trained), the input to the user representation model 310 may be a sequence of user behaviors 305, such as user behaviors 305*a*, 305*b*, 305*c*, etc. In one example, a sequence of user behaviors 305 may include: checking out cucumbers, checking out vegetable oil, and checking out eggs. Applying the user representation model 310 to this sequence of user behaviors 305, the output from the user representation model is one or more representations for a sequence of user behaviors and a user representation 315, which is an embedding representation or contextual vector of the user in a latent space given the sequence of user behaviors for the user. In some implementations, the input to the user representation model may include parameters associated with the user behaviors in the sequence, such as, product items checked out by the user, product ID associated with the items, item characteristics, warehouse locations, nutrition information of the product items, purchasing time, purchasing history, etc. In some implementations, the output may be a single embedding that indicates a user's intention and/or preference, which is used as the user representation 315 for a specific user. The user representation 315 may be stored in the data store 240 and used as an input for other models.

In one implementation, the user representation model 310 is a transformer model. For example, the user representation model 310 may take the sequence of user behaviors 305 and generate a contextual vector. The contextual vector may be used as the condensed user representation for user intentions and preferences. In some embodiments, the user representation model 310 may use an encoder-decoder architecture to capture the user intentions and preferences through intention layers.

In one or more embodiments, during the training process, the user representation model 310 may receive a sequence of user behaviors 305 and generate one or more tokens for each user behavior. The user representation model 310 may be trained by randomly masking one token in the sequence at a time and predicting a token based on the rest of unmasked tokens. By comparing the masked token and predicted token, the user representation model 310 may be trained to predict a user's intention or preference. In one example, the user representation model 310 may use a loss function to evaluate the prediction that indicates a difference between the expected token and the predicted token for each training instance. The parameters of the user representation model 310 are updated based on backpropagating error terms from the loss function.

By predicting the user behaviors, the user representation model 310 may generate a deeply bidirectional, unsupervised representation. Because of such a training process, the output of the user representation model 310 is a contextual vector representation (e.g., an embedding) of a user's intention and/or preference and is used as a user representation 315 that is personalized for the specific user based on the corresponding user's user behavior sequence.

Figure 3B:
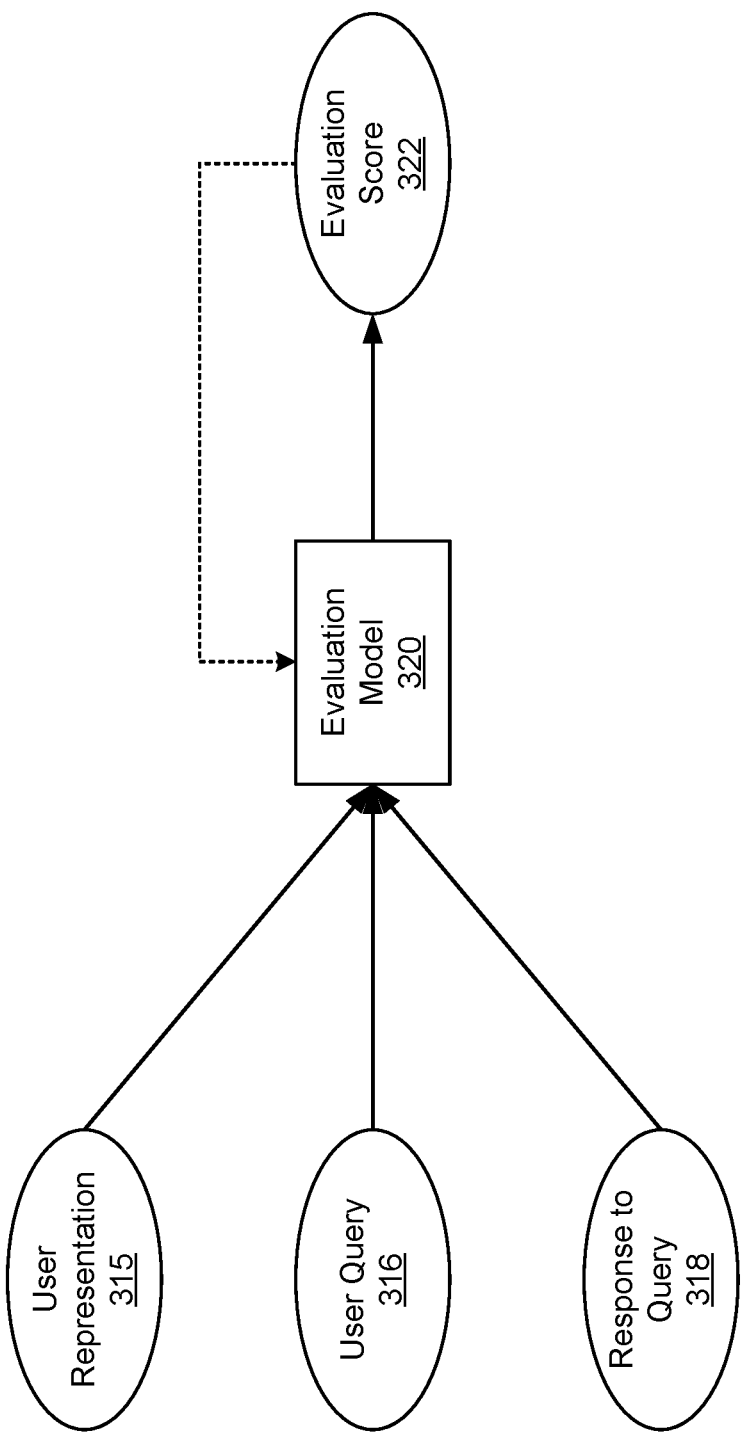
FIG. 3B illustrates an example algorithmic flow of applying evaluation model to evaluate a response to a query for a user at an online concierge system, in accordance with one or more embodiments.

Referring back to FIG. 2, the evaluation module 260 applies an evaluation model to evaluate a response to a query (or an answer to a question) for a specific user. FIG. 3B illustrates an example algorithmic flow of training evaluation model 320 to evaluate a response to a query for a user at an online concierge system 140, in accordance with one or more embodiments. During inference (after training the evaluation model 320), the input of evaluation model 320 may include user representations 315 (e.g., user embeddings), a user query 316, and a response 318 to the query. In some embodiments, the user query 316 may include a question, a request, and/or a query input by a user; and the response 318 to the query may include a response to the query/request, and/or an answer to the question generated by, for example, an LLM. The evaluation model 320 may calculate an evaluation score 322 to indicate how good/personalized/customized the response 318 is to the user query 316. For example, given a specific user, if the answer is a personalized answer to the user, the output score is higher than an un-personalized answer. The evaluation results (e.g., evaluation scores) from this evaluation model 320 may be used as basic guiding signals to personalize responses from LLM.

In one implementation, the evaluation model 320 is a supervised learning model to evaluate the personalization for individual customers based on user representations 315 and customer satisfaction signals. The training dataset may include a plurality of training examples. The training example may also include a plurality of input features, e.g., the user representations indicating the user's intentions and preferences. In one implementation, a training example may be associated with one user query and a set of responses to the query. Each of the set of responses may be labeled with an evaluation score indicating the level of personalization/customization for a user. In one or more embodiments, the evaluation model 320 may be hosted or deployed on the model serving system 150, and the evaluation module 260 provides the training examples to the model serving system 150 for training. The model serving system 150 applies estimated parameters of the evaluation model 320 to the input features, user query, and a response for the query to output an estimated evaluation score. The loss function is computed that indicates a difference between the estimated evaluation score and the known evaluation score. The parameters of the evaluation model 320 are updated to backpropagate error terms from the loss function.

In another example, the training example may be associated with a set of responses that are ranked based on the level of personalization/customization for a user, rather than an explicit evaluation score for each training example. For a pair of responses (with one being higher ranked than the other), the model serving system 150 applies estimated parameters of the evaluation model 320 to both the lower ranked and higher ranked responses. The loss function is computed that indicates a difference between the estimated evaluation scores between the higher ranked and lower ranked responses. The parameters of the evaluation model 320 are updated to backpropagate error terms from the loss function, such that the difference in evaluation scores between the two are maximized.

In some embodiments, the training examples used for training the evaluation model 320 may be collected based on user reactions to LLM generated responses as well as human evaluations. The evaluation model 320 may be based on a traditional logistic regression model architecture to provide evaluation results by taking contextual vectors of users (e.g., the user representations) and the LLM responses for the users.

In some embodiments, the training examples used for the evaluation model 320 may be generated based on existing customer service data. For example, the training examples may be generated based on conversational records of good customer service examples. The conversational records may be stored in the data store 240. In one example, the evaluation model 320 may leverage the communication records of highly satisfied customers as a positive training dataset (e.g., associated with higher evaluation scores or ranked higher depending on the training method) for personalized conversations. In another example, the evaluation model 320 leverages a customer service evaluation framework to evaluate an answer to a question. The framework may include five service dimensions, including: reliability, assurance, tangibles, empathy, and communication efficiency. A customer survey, and/or human evaluation may be used to translate the evaluation into concrete scores to cover each of the five service dimensions in the framework.

Referring back to FIG. 2, the personalization module 270 utilizes a personalization model 330 to provide personalized responses for customer services. The personalization model 330 integrates a machine learned language model (e.g., LLM of the model serving system 150) with the user representations and the evaluation model into a reinforcement learning framework that is iteratively trained based on individual user's intentions and preferences.

Figure 3C:
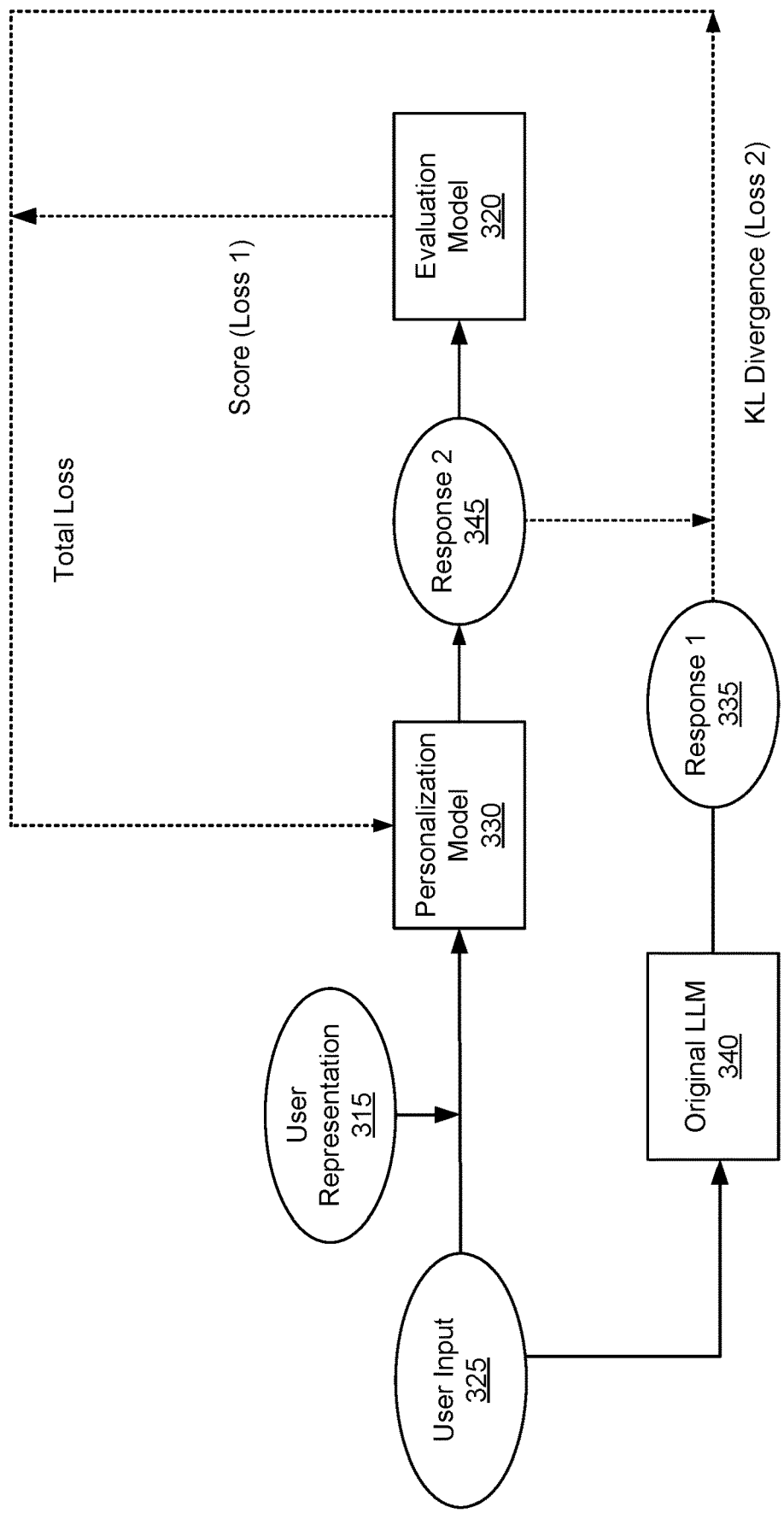
FIG. 3C illustrates an example algorithmic flow of training a personalization model by finetuning machine-learned language model, in accordance with one or more embodiments.

FIG. 3C illustrates an example algorithmic flow of training a personalization model 330 by finetuning machine-learned language model, in accordance with one or more embodiments. The machine-learned language model (i.e., the original model) may be a large language model (LLM), which is fine-tuned to generate personalized responses for customer service at the online concierge system 140. In some embodiments, the personalization model 330 may be trained using reinforcement leaning policy iterations. During the fine-tuning process in FIG. 3C, parameters of the original LLM 340 may be frozen, while parameters of the personalization model 330 are first copied based on the original LLM 340, but are updated through the fine-tuning process. In one or more embodiments, the personalization module 270 provides a set of training examples to the model deployment system 150 for fine-tuning the personalization model 330. The training examples include, for each user, a user representation and user input including a prompt/request.

As shown in FIG. 3C, a user input 325 is input to an original LLM 340 to generate a first response 335, e.g., Response 1. The user input 325 may include a user query, request, and/or question. The first response 335 (Response 1) may be a base response to the user request. A user representation 315 and the user input may be input to the personalization model 330 to generate a second response 345, e.g., Response 2. The user representation 315 may indicate a user's intention and/or preference. The second response 345 (Response 2) may be an estimated response to the user request that is personalized for the user.

The personalization model 330 leverages the evaluation model 320 to personalize answers for better customer satisfaction. For example, the second response 345 from the personalization model 330 is input to the evaluation model 320 to calculate an evaluation score of the second response 345, which measures how good the answers are based on the user's preferences and intentions. If the evaluation score is high, the evaluation model 320 may provide a signal to the personalization model 330 indicating that the second response 345 is a good answer. If the evaluation score is low, the objectives of the personalization model 320 may be adjusted. As shown in FIG. 3C, the user representation 315 and the user input 325 and the second response 345 may be input into the evaluation model 320 to generate the evaluation score. In some embodiments, a loss function is applied to calculate a loss (e.g., Loss 1) indicating the estimated evaluation score.

In one implementation, the personalization model 330 leverages the divergence between the responses from the personalization model 330 and the original LLM 340 to evaluate the truthfulness and usefulness of the estimated response from the personalization model 330. For example, the finetuning objective for training the personalization model 330 may use the original LLM response (Response 1) to measure the general quality of the estimated responses (Response 2) from the personalization model 330. A loss function may be applied to both responses to calculate a KL divergence (e.g., Loss 2) to evaluate how different the second response 345 is from the first response 335. In this way, the output from the personalization model 330 does not deviate too much from the output from the original LLM 340.

In some embodiments, the finetuning objective may combine the evaluation score and the KL divergence to provide feedback to the personalization model 330. For example, a loss function may be applied to combine a first loss indicating the estimated evaluation score and a second loss indicating a divergence between the base response (e.g., Response 1) and the estimated response (e.g., Response 2).

A total loss may be obtained based on the combined first loss and second loss. The total loss may be associated with a value indicating a level of the user's satisfaction, for example, how personalized the response to the user, and how accurate the response to the request. In the next iteration, the personalization model 330 can learn the user's preferences and intentions and adjust the differences from the original LLM using reinforcement learning. The parameters of the personalization model 330 may be updated by backpropagating through the personalization model 330 based on the total loss. Through this joint objective, personalized customization/optimization and general LLM evaluation may be balanced and align the personalization model 330 towards personalized experiences.

During the training, the user input 325 may be input to the original LLM 340, and the original LLM 340 may generate answers/questions word by word for each state. In one example, for each question, the objective of the personalization model 330 may be adjusted based on the scores output from the evaluation model 320. In some implementations, the training data may be automatically generated based on sample questions from a product log (e.g., stored at the data store 240).

FIG. 4 illustrates an example algorithmic flow 400 of using a personalization model to provide personalized responses for customer services at an online concierge system, in accordance with one or more embodiments. The online concierge system 140 may receive a user input 402 and generate a prompt based on the received user input 402. The online concierge system 140 applies a personalization model 406 to the prompt and receive a response 408 from the personalization model 406. The user input 402 may include a user request, question, query, etc. that is input from the user. The online concierge system 140 generates the prompt based on the user input 402 so that the prompt includes the user's request, question, query, etc. In one implementation, the prompt may include a task request and a user representation 404 that indicates the user's intention and/or preference. The personalization model 406 outputs the response 408 to the query from the knowledge that the personalization model 406 was trained on and based on the user representation 404 included in the prompt. In one example, the prompt represents a textual input to the personalization model 406. The user representation 404 is generated by the online concierge system 140 by applying a user representation model to a sequence of user activities performed by the user. In some implementations, the user representations 404 may be stored in the data store 240 and are accessed by the personalization model 406. Based on each received prompt, the personalization model 406 generates a personalized response 408 for the specific user.

In some embodiments, the personalization model 406 may output one or more personalized responses 408 and a value for each response 408 based on the corresponding level of user's satisfaction (e.g., personalization, accuracy, etc.). For example, the personalization model 406 may score (e.g., determine numerical values for) the responses 408 and rank the responses 408 based on their values. The content presentation module 210 displays the one or more responses 408 with the corresponding values that exceed some threshold. For example, the content presentation module 210 may determine the response for presentation to the user based on the values of the personalized responses (e.g., the top n response or the p percentile of responses). In one example, the content presentation module 210 may present the personalized response with the highest value in the rank. In another example, the content presentation module 210 may present a response having a value that meets a threshold value. In one implementation, the personalized response 408 has a value lower than a threshold value, and the personalization model may determine the response from the original LLM as the response for presentation to the user.

In one implementation scenario, the online concierge system 140 may receive a user's question, e.g., "what should I have for dinner?" Based on this user's request, the online concierge system 140 may generate a prompt to an LLM. Without incorporating personalization information into the prompt, an original LLM (e.g., LLM of the model serving system 150) may output a response, such as:

"Pasta with marinara sauce and vegetables: Boil your choice of pasta and top it with a flavorful marinara sauce. Add sautéed or roasted vegetables like bell peppers, zucchini, and mushrooms for a wholesome meal."

By applying the personalization model, the personalization module 270 may generate a prompt that incorporates the user representation, e.g., user's intention and preference. For example, the personalization module 270 may access the data store 240 and find the user's representation as "a Chinese, living in California, Cares about nutritional health, commonly shopping at XYZ store." The personalization module 270 may generate a prompt that includes the user's question and the determined user representation, and input the prompt into the personalization model to receive an output including a personalized response, such as:

"Stir-Fried Chicken and Vegetables with Brown Rice: Ingredients: . . . . Instructions: . . . . This meal provides a balance of protein from the chicken, vitamins and fiber from the vegetables, and complex carbohydrates from the brown rice. You can find the ingredients for this recipe at XYZ store, which offers a wide range of fresh produce, chicken, and pantry staples."

Figure 5A:
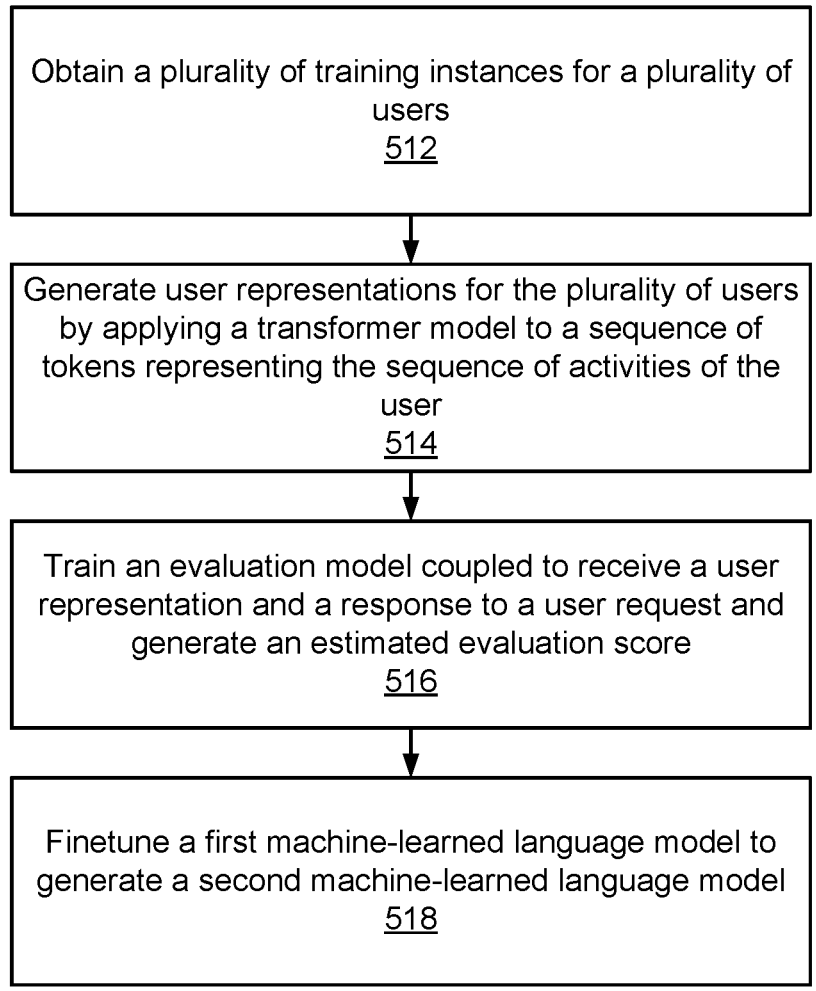
FIG. 5A is a flowchart of a method of training a personalization model, in accordance with one or more embodiments.

FIG. 5A is a flowchart of a method of training a personalization model, in accordance with one or more embodiments. Alternative embodiments may include more, fewer, or different steps from those illustrated in FIG. 5A, and the steps may be performed in a different order from that illustrated in FIG. 5A. These steps may be performed by an online concierge system (e.g., the online concierge system 140). Additionally, each of these steps may be performed automatically by the online concierge system without human intervention.

The online concierge system 140 obtains 512 a plurality of training instances for a plurality of users. In some embodiments, each of the plurality of training instance includes a user request to a service for a respective user, a sequence of activities of the user, one or more responses to the user request, and a score indicating the user's satisfaction of each of the one or more responses (e.g., the level of personalization of the response, the accuracy of the response to the request, etc.).

The online concierge system 140 generates 514 user representations for the plurality of users by applying a transformer model to a sequence of tokens representing the sequence of activities of the user. The sequence of activities may be a sequence of user behaviors of a user, such as user interactions with he online concierge system 140. For example, the transformer model may generate one or more tokens for each user behavior. In some embodiments, the transformer model may use an encoder-decoder architecture to capture the user intentions and preferences.

The online concierge system 140 trains 516 an evaluation model coupled to receive a user representation and a response to a user request. The online concierge system 140 trains the evaluation model to generate an estimated evaluation score which indicates the level of personalization/customization of the response to the user request. In some embodiments, the parameters of the evaluation model may be trained based on the responses to the user requests and the evaluation scores for the responses in the training instances.

The online concierge system 140 finetunes 518 a first machine-learned language model to generate a second machine-learned language model. The machine-learned language model may be a large language model (LLM), which is finetuned to generate a personalized response for customer service at the online concierge system 140. In some embodiments, the second machine-learned language model may be trained using reinforcement leaning policy iterations.

Figure 5B:
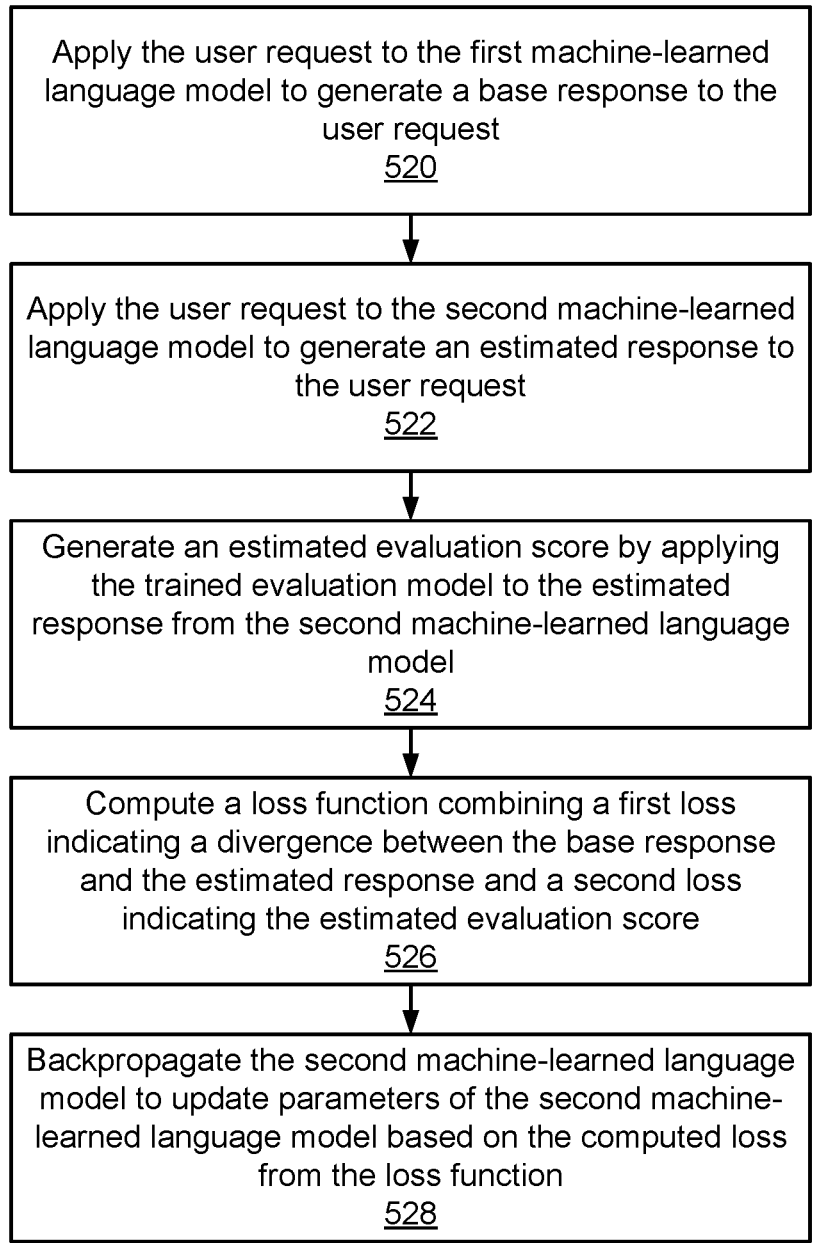
FIG. 5B is a flowchart of a method of finetuning the first machine-learned language model to generate the second machine-learned language model, in accordance with one or more embodiments.

FIG. 5B is a flowchart of a method of finetuning the first machine-learned language model to generate the second machine-learned language model, in accordance with one or more embodiments. Alternative embodiments may include more, fewer, or different steps from those illustrated in FIG. 5B, and the steps may be performed in a different order from that illustrated in FIG. 5B. These steps may be performed by an online concierge system (e.g., the online concierge system 140). Additionally, each of these steps may be performed automatically by the online concierge system without human intervention.

The online concierge system 140 applies 520 the user request to the first machine-learned language model to generate base response to the user request. The online concierge system 140 applies 522 the user request to the second machine-learned language model to generate an estimated response to the user request. The online concierge system 140 generates 524 an estimated evaluation score by applying the trained evaluation model to the estimated response from the second machine-learned language model. The online concierge system 140 computes 526 a loss function combining a first loss indicating a divergence between the base response and the estimated response and a second loss indicating the estimated evaluation score. The online concierge system 140 backpropagates 528 the second machine-learned language model to update parameters of the second machine-learned language model based on the computed loss from the loss function.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method of fine-tuning a machine-learned language model, comprising:
   obtaining a plurality of training instances for a plurality of users, each training instance including a user request to a service for a respective user, a sequence of activities of the user, one or more responses to the user request, and a score indicating a degree of satisfaction of the user of each of the one or more responses;
   generating a user representation for each of the plurality of users by applying a transformer model to a sequence of tokens representing the sequence of activities of the user, wherein the transformer model is configured as an encoder-decoder architecture and is trained by applying one or more masked tokens to one or more training instances;

training an evaluation model coupled to receive a user representation and a response to a user request, and generate an estimated evaluation score, wherein parameters of the evaluation model are trained based on the responses to the user requests and evaluation scores for the responses in the training instances, wherein the evaluation model is configured as a logistical regression model;

finetuning a first machine-learned language model to generate a second machine-learned language model, wherein the second machine-learned language model is configured as a transformer architecture including an attention operation, the attention operation coupled to receive input data and generate queries, keys, and values, and generate an attention output from the queries, the keys, and the values, the finetuning comprising:

applying the user request and the user representation to the first machine-learned language model to generate a base response to the user request;

applying the user request and the user representation to the second machine-learned language model to generate an estimated response to the user request;

generating an estimated evaluation score by applying the trained evaluation model to the estimated response from the second machine-learned language model;

generating a loss function combining a first loss indicating a divergence between the base response and the estimated response and a second loss indicating the estimated evaluation score;

computing gradients of the parameters of the second machine-learned language model; and updating parameters of the second machine-learned language model by combining the computed gradients of the parameters with current values of the parameters of the second machine-learned language model.

2. The method of claim 1, further comprising:

storing the updated parameters of the second machine-learned language model in a database;

receiving, from one or more client devices, a user input from a user, the user input associated with a request from the user;

identifying a user representation associated with the user;

generating a prompt for input to a finetuned machine-learned language model that is the second machine-learned language model, the prompt specifying at least the request from the user input, the user representation, and a request to generate a personalized response to the request from the user input;

providing the prompt to one or more model serving systems for execution by the finetuned machine-learned language model, receiving, from the one or more serving systems, one or more responses generated by executing the finetuned machine-learned language model on the prompt; and generating, based on the received one or more responses from the finetuned machine-learned language model, a response to the request from the user.

3. The method of claim 2, wherein each of the one or more responses generated by executing the finetuned machine-learned language model on the prompt is associated with a value indicating a level of user's satisfaction to response.

4. The method of claim 3, wherein generating the response to the request from the user based on the received one or more responses from the finetuned machine-learned language model comprises:

ranking, based on the value of each response that indicates the level of user's satisfaction to the response, the one or more responses; and generating a response with a highest value indicating the level of user's satisfaction as the response to the request from the user for presentation to the user.

5. The method of claim 3, wherein generating the response to the request from the user based on the received one or more responses from the finetuned machine-learned language model comprises:

comparing the value of each response that indicates the level of user's satisfaction to the response to a threshold value; and responsive to at least one of the responses having a value that meets the threshold value, generating the at least one of the responses as the response to the request from the user for presentation to the user.

6. The method of claim 1, wherein the user representation includes the user's intention and preference.

7. The method of claim 1, wherein training the evaluation model comprises training a supervised learning model to evaluate the level of personalization of the response to the user request based on the user representation.

8. A computer program product comprising a non-transitory computer readable storage medium having instructions encoded thereon that, when executed by a processor, cause the processor to perform steps comprising:

obtaining a plurality of training instances for a plurality of users, each training instance including a user request to a service for a respective user, a sequence of activities of the user, one or more responses to the user request, and a score indicating a degree of satisfaction of the user of each of the one or more responses;

generating a user representation for each of the plurality of users by applying a transformer model to a sequence of tokens representing the sequence of activities of the user, wherein the transformer model is configured as an encoder-decoder architecture and is trained by applying one or more masked tokens to one or more training instances;

training an evaluation model coupled to receive a user representation and a response to a user request, and generate an estimated evaluation score, wherein parameters of the evaluation model are trained based on the responses to the user requests and evaluation scores for the responses in the training instances, wherein the evaluation model is configured as a logistical regression model;

finetuning a first machine-learned language model to generate a second machine-learned language model, wherein the second machine-learned model is configured as a transformer architecture including an attention operation, the attention operation coupled to receive input data and generate queries, keys, and values, and generate an attention output from the queries, the keys, and the values, the fine-tuning comprising:

applying the user request and the user representation to the first machine-learned language model to generate a base response to the user request;

applying the user request and the user representation to the second machine-learned language model to generate an estimated response to the user request;

generating an estimated evaluation score by applying the trained evaluation model to the estimated response from the second machine-learned language model;

generating a loss function combining a first loss indicating a divergence between the base response and the estimated response and a second loss indicating the estimated evaluation score;

computing gradients of the parameters of the second machine-learned language model; and updating parameters of the second machine-learned language model by combining the computed gradients of the parameters with current values of the parameters of the second machine-learned model.

9. The computer program product of claim 8, wherein the instructions further cause the processor to perform steps comprising:

storing the updated parameters of the second machine-learned language model in a database;

receiving, from one or more client devices, a user input from a user, the user input associated with a request from the user;

identifying a user representation associated with the user;

generating a prompt for input to a finetuned machine-learned language model that is the second machine-learned language model, the prompt specifying at least the request from the user input, the user representation, and a request to generate a personalized response to the request from the user input;

providing the prompt to one or more model serving systems for execution by the finetuned machine-learned language model, receiving, from the one or more serving systems, one or more responses generated by executing the finetuned machine-learned language model on the prompt; and generating, based on the received one or more responses from the finetuned machine-learned language model, a response to the request from the user.

10. The computer program product of claim 9, wherein each of the one or more responses generated by executing the finetuned machine-learned language model on the prompt is associated with a value indicating a level of user's satisfaction to response.

11. The computer program product of claim 10, wherein the instructions to generate the response to the request from the user based on the received one or more responses from the finetuned machine-learned language model further cause the processor to perform steps comprising:

ranking, based on the value of each response that indicates the level of user's satisfaction to the response, the one or more responses; and generating a response with a highest value indicating the level of user's satisfaction as the response to the request from the user for presentation to the user.

12. The computer program product of claim 10, wherein the instructions to generate the response to the request from the user based on the received one or more responses from the finetuned machine-learned language model further cause the processor to perform steps comprising:

comparing the value of each response that indicates the level of user's satisfaction to the response to a threshold value; and responsive to at least one of the responses having a value that meets the threshold value, generating the at least one of the responses as the response to the request from the user for presentation to the user.

13. The computer program product of claim 9, wherein the user representation includes the user's intention and preference.

14. The computer program product of claim 9, wherein training the evaluation model comprises training a supervised learning model to evaluate the level of personalization of the response to the user request based on the user representation.

15. A computer system comprising:

a processor; and a non-transitory computer-readable storage medium having instructions that, when executed by the processor, cause the computer system to perform steps comprising:

obtaining a plurality of training instances for a plurality of users, each training instance including a user request to a service for a respective user, a sequence of activities of the user, one or more responses to the user request, and a score indicating a degree of satisfaction of the user of each of the one or more responses;

generating a user representation for each of the plurality of users by applying a transformer model to a sequence of tokens representing the sequence of activities of the user, wherein the transformer model is configured as an encoder-decoder architecture and is trained by applying one or more masked tokens to one or more training instances;

training an evaluation model coupled to receive a user representation and a response to a user request, and generate an estimated evaluation score, wherein parameters of the evaluation model are trained based on the responses to the user requests and evaluation scores for the responses in the training instances, wherein the evaluation model is configured as a logistical regression model;

finetuning a first machine-learned language model to generate a second machine-learned language model, wherein the second machine-learned language model is configured as a transformer architecture including an attention operation, the attention operation coupled to receive input data and generate queries, keys, and values, and generate an attention output from the queries, the keys, and the values, the finetuning comprising:

applying the user request and the user representation to the first machine-learned language model to generate a base response to the user request;

applying the user request and the user representation to the second machine-learned language model to generate an estimate response to the user request;

generating an estimated evaluation score by applying the trained evaluation model to the estimated response from the second machine-learned language model;

generating a loss function combining a first loss indicating a divergence between the base response and the estimated response and a second loss indicating the estimated evaluation score;

computing gradients of the parameters of the second machine-learned language model; and updating parameters of the second machine-learned language model by combining the computed gradients of the parameters with current values of the parameters of the second machine-learned language model.

16. The computer system of claim 15, wherein the instructions further cause the computer system to perform steps comprising:
- storing the updated parameters of the second machine-learned language model in a database;
- receiving, from one or more client devices, a user input from a user, the user input associated with a request from the user;
- identifying a user representation associated with the user;
- generating a prompt for input to a finetuned machine-learned language model that is the second machine-learned language model, the prompt specifying at least the request from the user input, the user representation, and a request to generate a personalized response to the request from the user input;
- providing the prompt to one or more model serving systems for execution by the finetuned machine-learned language model,
- receiving, from the one or more serving systems, one or more responses generated by executing the finetuned machine-learned language model on the prompt; and
- generating, based on the received one or more responses from the finetuned machine-learned language model, a response to the request from the user.

17. The computer system of claim 16, wherein each of the one or more responses generated by executing the finetuned machine-learned language model on the prompt is associated with a value indicating a level of user's satisfaction to response.

18. The computer system of claim 17, wherein the instructions to generate the response to the request from the user based on the received one or more responses from the finetuned machine-learned language model further cause the processor to perform steps comprising:
- ranking, based on the value of each response that indicates the level of user's satisfaction to the response, the one or more responses; and
- generating a response with a highest value indicating the level of user's satisfaction as the response to the request from the user for presentation to the user.

19. The computer system of claim 17, wherein the instructions to generate the response to the request from the user based on the received one or more responses from the finetuned machine-learned language model further cause the processor to perform steps comprising:
- comparing the value of each response that indicates the level of user's satisfaction to the response to a threshold value; and
- responsive to at least one of the responses having a value that meets the threshold value, generating the at least one of the responses as the response to the request from the user for presentation to the user.

20. The computer system of claim 15, wherein the user representation includes the user's intention and preference.

* * * * *